United States Patent [19]
Munro et al.

[11] Patent Number: 4,945,429
[45] Date of Patent: Jul. 31, 1990

[54] DATA SECURITY ARRANGEMENT FOR AN AUTOMATED MAGNETIC TAPE CARTRIDGE LIBRARY SYSTEM

[75] Inventors: Frederick G. Munro, Broomfield; Kelly J. Beavers, Boulder; Ronald W. Korngiebel; Raymond L. Lucchesi, both of Broomfield; Michael E. Moy, Lafayette, all of Colo.

[73] Assignee: Storage Technology Corporation, Louisville, Colo.

[21] Appl. No.: 148,599

[22] Filed: Jan. 27, 1988

[51] Int. Cl.$^5$ .................. G11B 17/22; G11B 21/08
[52] U.S. Cl. .................. 360/92; 198/349.6; 360/98.05; 364/478; 369/33; 369/34; 414/273
[58] Field of Search .................. 369/32, 33, 34, 36, 369/37, 38, 39, ; 414/273, 786; 198/349.6, 366; 360/71, 72.2, 72.3, 92, 98.04, 98.05, 98.06, 99.07; 364/478

[56] References Cited

U.S. PATENT DOCUMENTS

| | | | |
|---|---|---|---|
| 3,831,197 | 8/1974 | Beach et al. | 360/71 |
| 3,920,195 | 11/1975 | Sills et al. | 242/180 |
| 4,271,440 | 6/1981 | Jenkins et al. | 360/92 |
| 4,527,262 | 7/1985 | Manto | 369/38 |
| 4,654,727 | 3/1987 | Blum et al. | 360/71 |
| 4,766,581 | 8/1988 | Korn et al. | 369/34 |

*Primary Examiner*—Steven L. Stephan
*Attorney, Agent, or Firm*—Dorr, Carson, Sloan, & Peterson

[57] ABSTRACT

This data security arrangement provides a significant level of data security in an automatic magnetic tape cartridge library by isolating the actual data from the control of the data retrieval process. This isolation is accomplished by the use of a plurality of architectural devices that dissociate control and data. The data written on the magnetic tape cartridges cannot be accessed by the library modules. The library modules are not electrically connected to the tape drives or the data bus that connects the tape drives to the host computer. In addition, library software on the host computer emulates an operator's console and intercepts all tape mount commands generated by the host computer. The library software translates these commands into control signals to activate the library module to retrieve a designated magnetic tape cartridge and load this cartridge into a tape drive. Thus, the data retrieval apparatus is separate from the library control apparatus. The library module is unaware of the identity of the data stored on the magnetic tape cartridges and the host computer is unaware of the existence of the automated magnetic tape cartridge library.

15 Claims, 13 Drawing Sheets

DATA SECURITY ARRANGEMENT FOR AN AUTOMATED MAGNETIC TAPE CARTRIDGE LIBRARY SYSTEM

FIELD OF THE INVENTION

This invention relates to automated library systems and, in particular, to an automated magnetic tape cartridge library system that provides data security to prevent unauthorized access to the data stored therein.

PROBLEM

It is a problem in data processing systems to provide data storage capacity that is both inexpensive, readily accessible to the user and yet secure from unauthorized access. The presently available choices for data storage: on-line using direct access storage devices (DASD) that are connected to the computer or off-line using 9 or 18 track magnetic tape cartridges that are either manually retrieved by an operator or automatically retrieved by a single robot mechanism and loaded on a tape drive. The on-line DASD memory provides immediately available data but is very expensive, has a limited storage capacity and is difficult to protect from unauthorized access. The off-line manually loaded magnetic tape cartridge memory is inexpensive per unit of data storage, has unlimited storage capacity but is very slow in terms of data retrieval times and is difficult to protect from unauthorized access. The off-line robotically loaded magnetic tape cartridge memory is more expensive and has a faster data retrieval time than the manual off-line system but is also difficult to protect from unauthorized access. In addition, off-line storage systems are generally floor space intensive systems and require physical access security.

All of these data storage systems operate under direct control of the host computer system which maintains a close identifiable correspondence between the identity of the data files stored in the data storage system and their physical/electronic location in the data storage system. The control and data retrieval paths of these systems are typically shared paths or collocated. Thus, it is relatively easy to obtain either physical access to the data storage media or electronic access to the data files stored therein. There is presently no adequate solution to the problem of storing large amounts of data inexpensively, which data is retrievable in a timewise efficient manner and yet secure from unauthorized access.

SOLUTION

The aforementioned problems are solved and a technical advance achieved in the art by the data security arrangement for an automated magnetic tape cartridge library system of this invention. The automated magnetic tape cartridge library system consists of a plurality of independent yet interconnectable automated magnetic tape cartridge library modules. Each library module consists of two concentrically arranged cylindrical arrays of tape cartridge storage cells. A robot arm, pivotally rotatable about the center of the concentrically arranged cylinders contains a tape cartridge retrieval mechanism. This tape cartridge retrieval mechanism is located between the two concentrically arranged cylindrical arrays of tape cartridge storage cells for retrieving and replacing magnetic tape cartridges in the storage cells, thereby eliminating the need for human access to the magnetic tape cartridges. The inner and outer cylindrical arrays of tape cartridge storage cells are arranged to be loaded from this common area between the two cylinders so that the tape cartridge retrieval mechanism accesses both cylindrical arrays from this common area.

The entire library module is enclosed in a secure exterior housing that prevents unauthorized access to the magnetic tape cartridges stored in the library module and also serves to provide structural support to the two concentrically arranged cylindrical arrays of tape cartridge storage cells. The exterior housing of this expandable automated tape cartridge library system is in the shape of a dodecahedron. The twelve sides provided by this exterior housing enable a plurality of the library modules to be interconnected. A control unit is connected to one of the twelve faces of the exterior housing to provide the control circuitry and software to regulate the operation of the robot arm contained in the library module. In addition, one or more tape drive units may be mounted on other ones of the twelve sides of the library module exterior housing. The tape drive units function to retrieve data that is stored on the 18 track magnetic tape cartridges that are stored in the library module.

The control and data signaling paths are completely independent of each other. The library modules are not electrically connected to the tape drive units or the data retrieval bus that interconnects the host computer and the tape drive units. Thus, the library modules cannot access the data written on the magnetic tape cartridges that are stored therein. Similarly, the control path connects the host computer to the control unit of the library module via a library management unit. The host computer contains library software that transmits tape identity information to the library module to regulate the retrieval of the magnetic tape cartridges. The library software translates the data file identity into coded magnetic tape cartridge identity characters that are imprinted on a label in machine-readable characters affixed to the magnetic tape cartridge. Thus, the library module is unaware of the identity of the data stored on the magnetic tape cartridges and the host computer is unaware of the identity of the magnetic tape cartridge that contains a particular data file.

The actual magnetic tape cartridge and tape drive selection is accomplished by library software in the host computer that is interposed between the host computer and the control unit of the library module. The host computer responds to a user requesting access to a particular magnetic tape cartridge by issuing a tape cartridge mount command to the operator console of the host computer. Library software on the host computer emulates the operation of the operator console and intercepts this command and identifies the magnetic tape cartridge to be loaded by the library module. This software located on the host computer translates the designation of the selected magnetic tape cartridge to a physical location of the tape cartridge storage cell within the library storage module where the selected magnetic tape cartridge is located. In addition, the library software selects an available tape drive into which the selected magnetic tape cartridge is mounted. Thus, the host computer is not even aware of the existence of the automated tape cartridge library system since the library software located on the host computer emulates an operator console.

The control unit activates the robot arm which consists of a six-motion, servo-controlled mechanism in response to control signals received from the library management unit. This mechanism contains the necessary apparatus to accurately locate and retrieve the selected magnetic tape cartridge from the identified tape cartridge storage cell in the storage array, transport the selected magnetic tape cartridge to the designated tape drive unit and load the selected magnetic tape cartridge into the tape drive unit so that the data can be retrieved therefrom by the host computer. The robot arm mechanism can also retrieve the magnetic tape cartridge from the tape drive once the host computer has completed its data retrieval from the selected magnetic tape cartridge. The robot arm mechanism then returns the magnetic tape cartridge to the designated tape cartridge storage cell in the storage cell array. The robot arm mechanism simply performs a tape cartridge transport function and is not aware of the identity of the data stored on the magnetic tape cartridge or the identity of the host computer to which the data is transmitted.

A plurality of the automated tape cartridge library modules can be interconnected to provide an expansion capability by placing two or more of the automated tape cartridge library modules together in an adjacent abutting fashion. Each connected automated tape cartridge library module is equipped with one or more pass-through ports which provide a mechanism for transferring a selected tape cartridge from the automated tape cartridge library module in which it is stored to another automated tape cartridge library module which abuts the pass-through port. Thus, the pass-through port mechanism is the means that interconnects two adjoining automated tape cartridge library modules and that enables a magnetic tape cartridge to be passed by one robot arm in a first automated tape cartridge library module to the robot arm in the second automated tape cartridge library module. Thus, magnetic tape cartridges can be passed among the plurality of interconnected automated tape cartridge library modules.

This capability provides a number of advantages. The first advantage is that the automated tape cartridge library system can be expanded by appending additional automated tape cartridge library modules to the existing configuration of automated tape cartridge library modules. This expansion capability provides great flexibility due to the twelve-sided arrangement of the exterior housing of the library module. The twelve sides of the library module provide a multitude of configuration possibilities in terms of interconnecting automated tape cartridge library modules as well as locating tape drive units. The configuration of automated tape cartridge library modules can be adapted to most physical floor space limitations and the number of tape drive units can be adapted to the needs of the host computer data processing system. This also provides additional data security since no tape drive is used exclusively for the library module to which it is connected. Thus, by coordinating the operation of a plurality of automated tape cartridge library modules, each and every magnetic tape cartridge in the library can be mounted on any selected tape drive in the entire complex. This is accomplished by transporting a selected magnetic tape cartridge from the automated tape cartridge library module in which it is stored to the automated tape cartridge library module that contains the available tape drive unit. The selected magnetic tape cartridge is passed from automated tape cartridge library module to an automated tape cartridge library module through the pass-through port that interconnects adjoining automated tape cartridge library modules.

This arrangement provides a significant level of data security by isolating the actual data and the control of the data retrieval process. This isolation is accomplished by the use of a plurality of architectural devices that dissociate control and data. The data written on the magnetic tape cartridges cannot be accessed by the library modules. The library modules are not electrically connected to the tape drives or the data bus that connects the tape drives to the host computer. Thus, the data retrieval apparatus is separate from the library control apparatus.

The library software in the host computer emulates the operator's console so the host computer is unaware of the existence of the automated magnetic tape cartridge library system. The library software intercepts tape cartridge mount commands and translates them into tape cartridge location data. This location data is transmitted to the library module containing the selected magnetic tape cartridge which uses this data to retrieve the selected magnetic tape cartridge. The magnetic tape cartridge is identified by a label that contains a machine-readable identification code imprinted thereon. Thus, the library module can identify the magnetic tape cartridges stored therein.

The library modules are each enclosed in a locked secure housing to prevent unauthorized access to the magnetic tape cartridges. This housing includes an access door that has a sensor device that records any access to the library module. Thus, the library module is secure from unauthorized intrusion.

All of these devices serve to provide a coordinated data security arrangement by isolating data retrieval from library control. The library system is operable to store and robotically retrieve magnetic tape cartridges without any knowledge of the data stored therein. Similarly, the data processing system reads/writes data on the retrieved magnetic tape cartridges without knowledge of the presence of the automated magnetic tap cartridge library system.

DETAILED DESCRIPTION OF THE DRAWINGS

Figure 1:
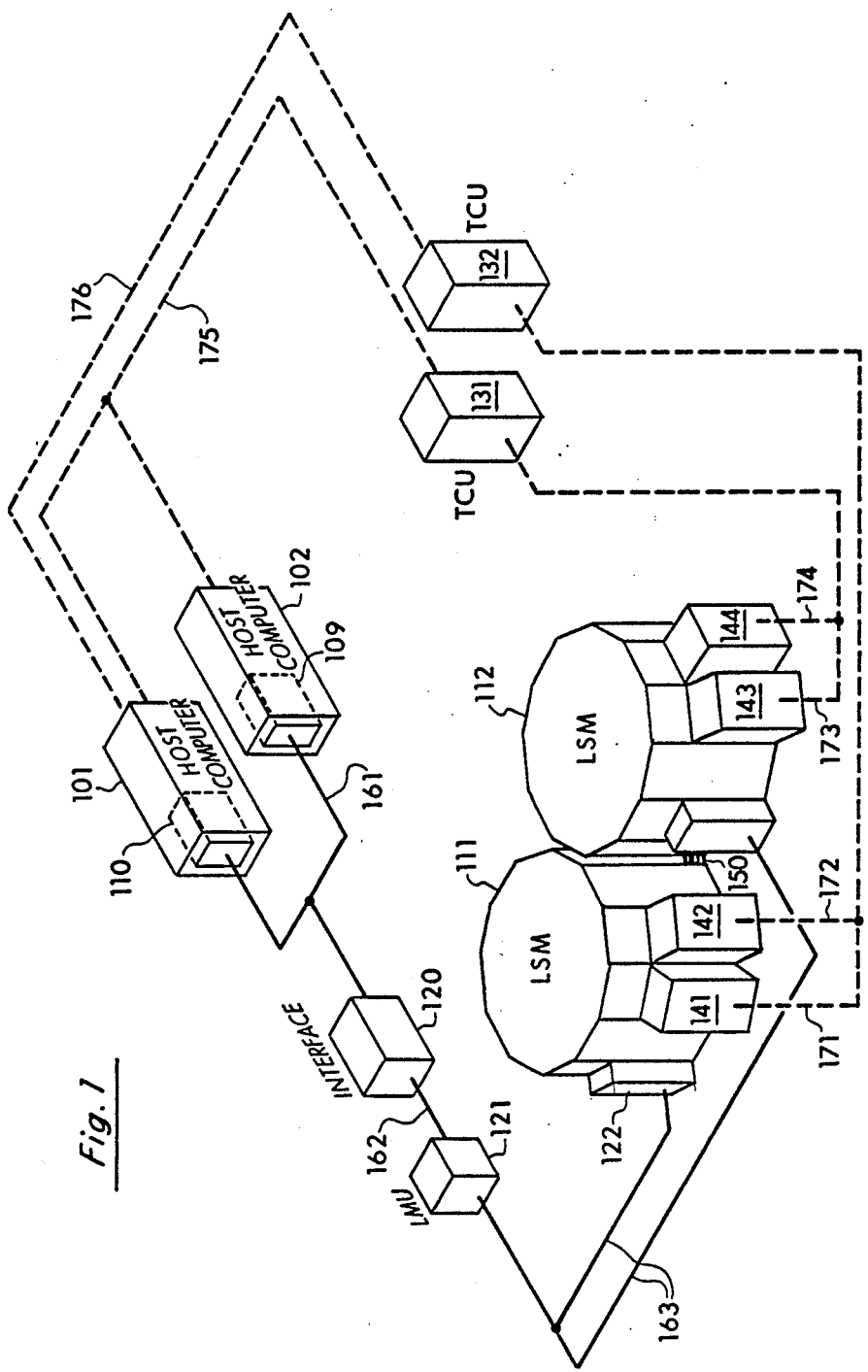
FIG. 1 illustrates the automated magnetic tape cartridge library system in block diagram form.

FIG. 1 illustrates in block diagram form the automated magnetic tape cartridge library system. A plurality of host computers 101, 102 are shown connected to the automated magnetic tape cartridge library system by means of two paths, a control path 161, 162 and a data path 171-175 described in more detail below. A plurality (up to sixteen) of host computers can be interconnected to a plurality (up to sixteen) of automated magnetic tape cartridge library systems, but only two computers and a single library system are illustrated for simplicity. The automated magnetic tape cartridge library system 100 consists of a plurality of elements. Among these elements are included two automated magnetic tape cartridge library modules (library modules) 111 and 112, each of which stores 18 track magnetic tape cartridges of the IBM 3480 type for use by host computers 101, 102. Each of library modules 111 and 112 stores up to 6,000 of the magnetic tape cartridges and contains a robot arm system that functions to retrieve the magnetic tape cartridges from tape cartridge storage cells contained in the library module and load the retrieved magnetic tape cartridges on tape drive systems shown in FIG. 1 as a plurality of elements 141-144 attached to each of library modules 111, 112. Any type of information storage volume can be used in this type of library system and the magnetic tape cartridges are illustrated due to their widespread use in the data processing industry.

A system of control elements 120, 121, 122, 123 are illustrated connected between host computer 101 and each library module 111, 112. The control elements illustrated in FIG. 1 operate to control the robot arm mechanism in each of library modules 111 and 112. In operation, a user connected to host computer 101 requests access to data stored in a designated tape cartridge, which tape cartridge is stored in, for example, library module 111. Host computer 101 translates the request for this data into an operator console tape mount request message. Tape cartridge library software 109, 110 resides on host computers 102, 101 respectively and functions to interface the automated magnetic tape cartridge library system in transparent fashion to host computer 102, 101. This is accomplished by tape cartridge library software 110 which traps operator console messages from host computer 001 and converts these console messages into magnetic tape cartridge retrieval commands that are transmitted via data link 162 to library management unit 121.

Tape cartridge library software 110 contains a data base that provides the translation between tape cartridge volume records and the tape mount request operator console messages from host computer 101. Thus, a data retrieval request from host computer 101 is intercepted by tape cartridge library software 110 and used to scan the tape volume records to identify the exact physical location of the requested tape cartridge. Tape cartridge library software 110, determines the exact physical location of the requested tape cartridge in one of library modules 111 and 112 and the availability of one of tape drives 141-144 as well as the identity of the library module that contains the requested magnetic tape cartridge. Tape cartridge library software 110 then transmits control signals over path 161, via terminal control unit 120 and data link 162 to library management unit 121 to identify the exact location of the requested tape cartridge and the exact location of the destination tape drive.

Library management unit 121 responds to the exact physical location control signals from tape cartridge library software 110 by determining a path assignment from tape cartridge storage cell to the designated tape drive. For example, assume that the requested tape cartridge is located in library module 111 and the selected cartridge tape drive unit is 144 which is attached to library module 112. Library management unit 121 designates all of the functional steps to be taken by library modules 111 and 112 to effectuate the transfer of the requested tape cartridge from library module 111 to the selected tape drive unit 144 located on library module 112. These control signals are transmitted via control paths 163 and 164 to library control units 122 and 123 respectively. Library management unit 121 transmits control signals over control path 163 to library control unit 122 to identify the exact physical location of the requested tape cartridge. The robot arm in library module 111 is controlled by library control unit 122 which translates the control signals received from library management unit 121 into servo control signals to regulate the operation of the various servo systems (described below) of the robot arm in library module 111. Library control unit 122 causes the robot arm in library module 111 to retrieve the requested tape cartridge from the tape cartridge storage cell in library module 111.

The retrieved tape cartridge is transported by the robot arm in library module 111 to library module 112 by way of pass-through port 150 which is a device that interconnects two library modules 111, 112. The pass-through port is a mechanism that enables adjacent library modules to pass retrieved tape cartridges back and forth between the library modules for loading on a designated tape drive or for returning to the tape cartridge storage array. The pass-through port mechanism 150 that interconnects library module 111 with library module 112, in response to control signals from library control unit 122, rotates to face the robot arm in library module 111. The robot arm in library module 111, in response to the control signals from library control unit 122, places the retrieved tape cartridge in the reserved slot in pass-through port 150. Library management unit 121 upon he completion of the tape retrieval operation by library module 111, transmits control signals on control path 163 to library control unit 122 to activate passthrough port 150 to transport the retrieved tape cartridge to face the robot arm in library module 112. Library management unit 121 then transmits control signals on control path 164 to library control unit 123 associated with library module 112. Library control unit 123 responds to these control signals by generating servo control signals to regulate the operation of the robot arm in library module 112. These control signals cause the robot arm in library module 112 to retrieve the tape cartridge placed in pass-through port 150 by the robot arm in library module 111. The tape cartridge so retrieved by the robot arm in library module 112 is then placed by the robot arm in tape drive 144 as designated by library management unit 121. In this fashion, a data retrieval request from host computer 101 is translated into the identification of a designated tape cartridge, this cartridge is automatically retrieved from its storage rack and transported to a library module that contains an available tape drive. That library module then loads the retrieved tape cartridge into the tape drive where it can be read by host computer 101.

The automated tape cartridge library system 100 contains a separate data path completely independent and isolated from the control path described above. The separate and independent data path consists of tape drive units 141-144, data paths 171-174, tape control unit 131 and data link 175. The retrieved tape is loaded onto tape drive 144 where it is read in the usual fashion, with the data output on lead 174 to tape control unit 131. The data from all the tape drives 141-144 is multiplexed together in tape control unit 131 and transmitted over data link 175 to host computers 101 and 102. Thus, the data read from the retrieved tape cartridge is transmitted from tape drive unit 144 through tape control unit 131 to host computer 101 without the automated tape cartridge library system 100 being aware of the destination of the data.

Figure 2:
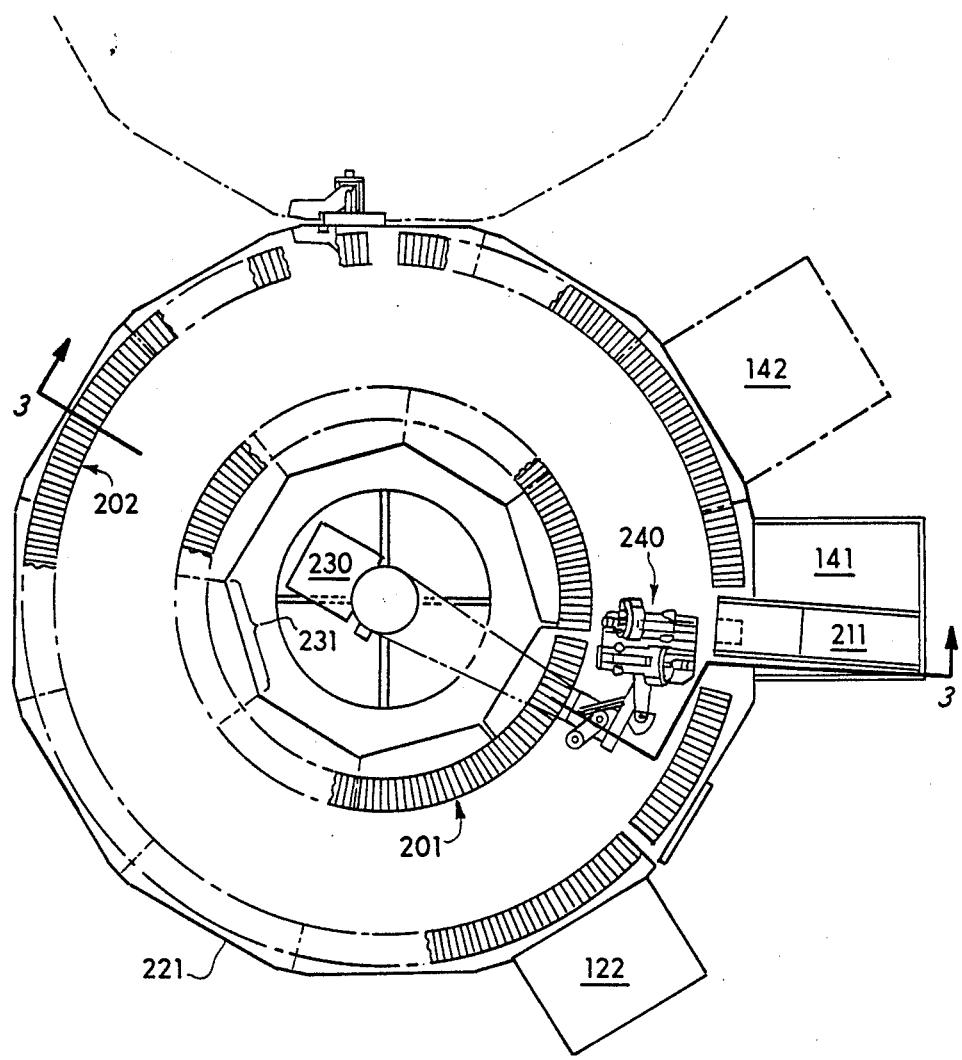
FIG. 2 illustrates a top view of a library module.
Figure 3:
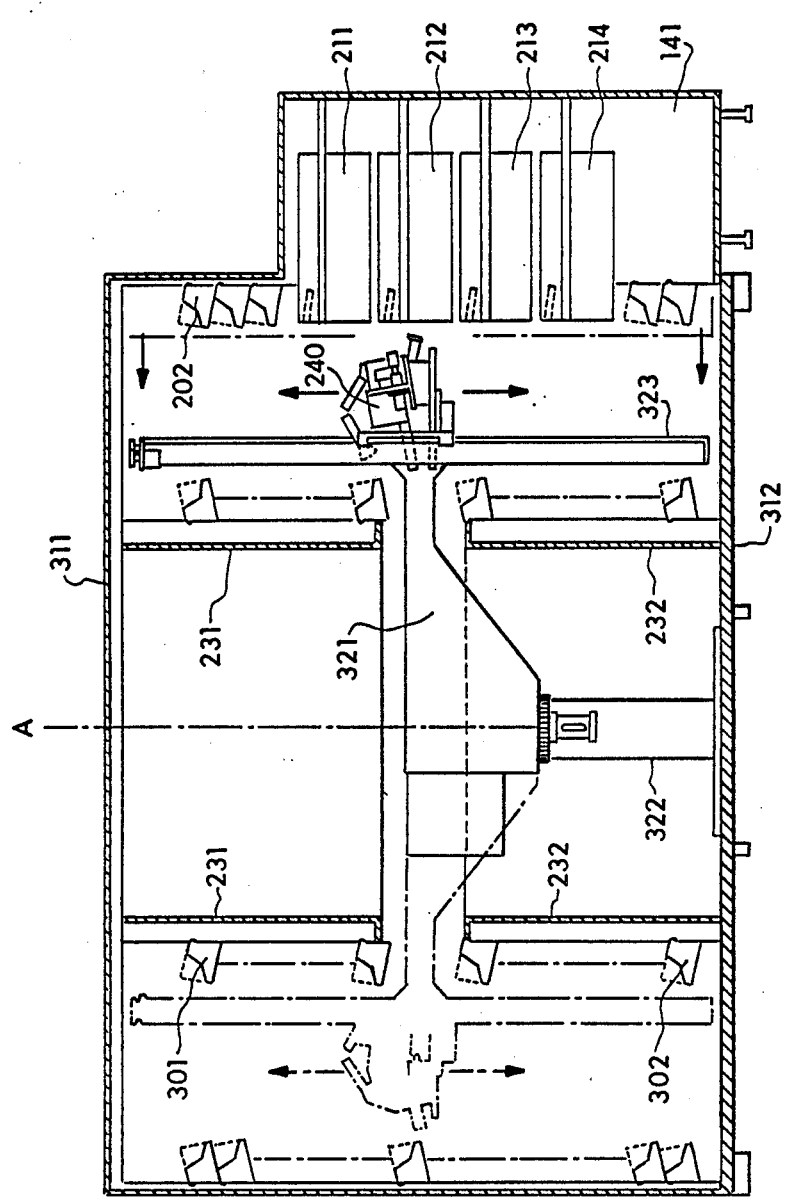
FIG. 3 illustrates a cut away view of a library module with its associated robot arm mechanism and tape cartridge storage cell array.

In order to more fully understand the operation of the automated tape cartridge library system 100, additional details of the structure of library modules 111, 112 are disclosed below, as well as the control software in tape cartridge library software 110 and library management unit 121. FIG. 2 illustrates a top view of the library module with the ceiling removed while FIG. 3 illustrates a cut away side perspective view of library module 111.

Exterior Housing

Each library module 111 consists of a stand alone exterior housing which consists of a plurality of wall segments 221 attached to floor 312 and ceiling 311 plates and disposed about a vertical axis A. There is included an inner wall having a plurality of segments 231 forming upper portion which is suspended from a ceiling 311 o the library module 111 and another plurality of like segments 232 forming a lower portion of the interior wall which is mounted on the floor plates 312 to support a first cylindrical array 201 of tape cartridge storage cells centered about the vertical axis A. A second cylindrical array 202 of tape cartridge storage cells is concentrically arranged about the first array 201 and mounted on the wall segments 221 of the outer housing. A configuration of the segments 221 of the outer wall housing are such that the resulting structure is in the shape of a dodecahedron. The twelve-sided arrangement of the library module provides great flexibility in configuring both the tape drive units as well as configuring a plurality of library modules in a juxtaposed arrangement.

One of exterior wall segments 221 and its associated tape cartridge storage cells is hinged to provide an access door for entry into the library module. This access door is provided for maintenance access to the robot arm and also to permit an operator to retrieve and load magnetic tape cartridges into the tape drives in the event of a failure of the library module. In order to prevent unauthorized access to the library module, the access door includes a lock mechanism and a latching sensor that records a use of the access door whether or not the library module is provided with electricity. Thus the control unit can read the state of this latching sensor to determine whether the access door was opened. Removing electrical power from the library module does not defeat the operability of the latching sensor. Thus, every use of the access door can be recorded to detect an unauthorized entry into the library module.

TAPE CARTRIDGE STORAGE CELLS

Figure 5:
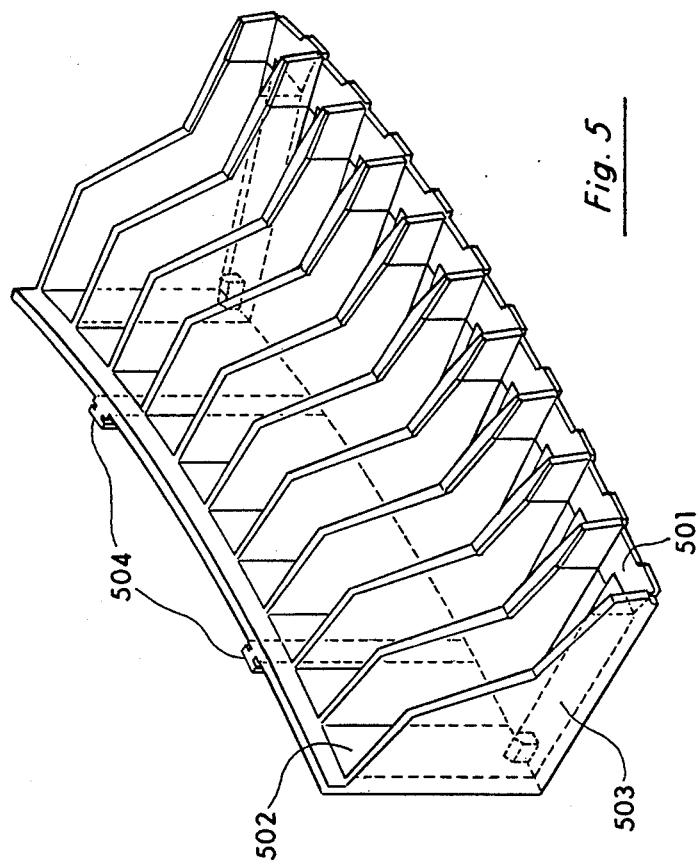
FIG. 5 illustrates a perspective view of the tape cartridge storage cells.

Library module 111 contains two concentrically arranged cylindrical arrays of tape cartridge storage cells 201, 202. FIG. 5 illustrates in additional detail the arrangement of a particular array of tape cartridge storage cells. The array of tape cartridge storage cells illustrated in FIG. 5 has a radius of curvature adapted to mounted in the inner cylindrical array 201 of tape cartridge storage cells of library module 111. The tape cartridge storage cells on the outer cylindrical array 202 are formed with an opposite curvature so that all of the tape cartridge storage cells in the inner 201 and outer 202 cylindrical arrays face each other so that the robot arm 230 can retrieve tape cartridges from either the inner 201 or the outer 202 cylindrical array. The tape cartridge storage cells illustrated in FIG. 5 consist of a bottom portion 501, a back portion 502 with intervening wall segments 503 to provide a plurality of slots or cells for the storage of the tape cartridges. Bottom portion 501 of the tape cartridge storage cells is angled downward, front to back, so that a tape cartridge placed in the tape cartridge storage cell tends to slide along bottom portion 501 into the tap cartridge storage cell. The wall segments 503 are adapted for access by the hand and finger assemblies 240 of the robot arm 230. In addition, attachment apparatus such as hooks 504 formed at the rear of the array of tape cartridge storage cells can be used to suspend the tape cartridge storage cells from the wall segments of library module 111.

The arrangement of tape cartridge storage cells is illustrated more clearly in FIG. 3 wherein the outer cylindrical array 202 is illustrated along the periphery of library module 111. The inner cylindrical array of tape cartridge storage cells 201 is illustrated in FIG. 3 as comprising two individual segments. A first segment 302 of the inner cylindrical array is arranged as standing on the floor 312 of library module 111. A second segment 301 of the inner cylindrical array 201 is illustrated in FIG. 3 as suspended from the ceiling 311 of the library module 111. In this fashion, an aperture is provided between the upper 301 and lower 302 segments of the inner cylindrical array 201 so that robot arm 230 can rotate about the center pivot axis "A" without interfering with any of the tape cartridge storage cells in the inner cylindrical array 201.

ROBOT ARM MECHANISM

Figure 4:
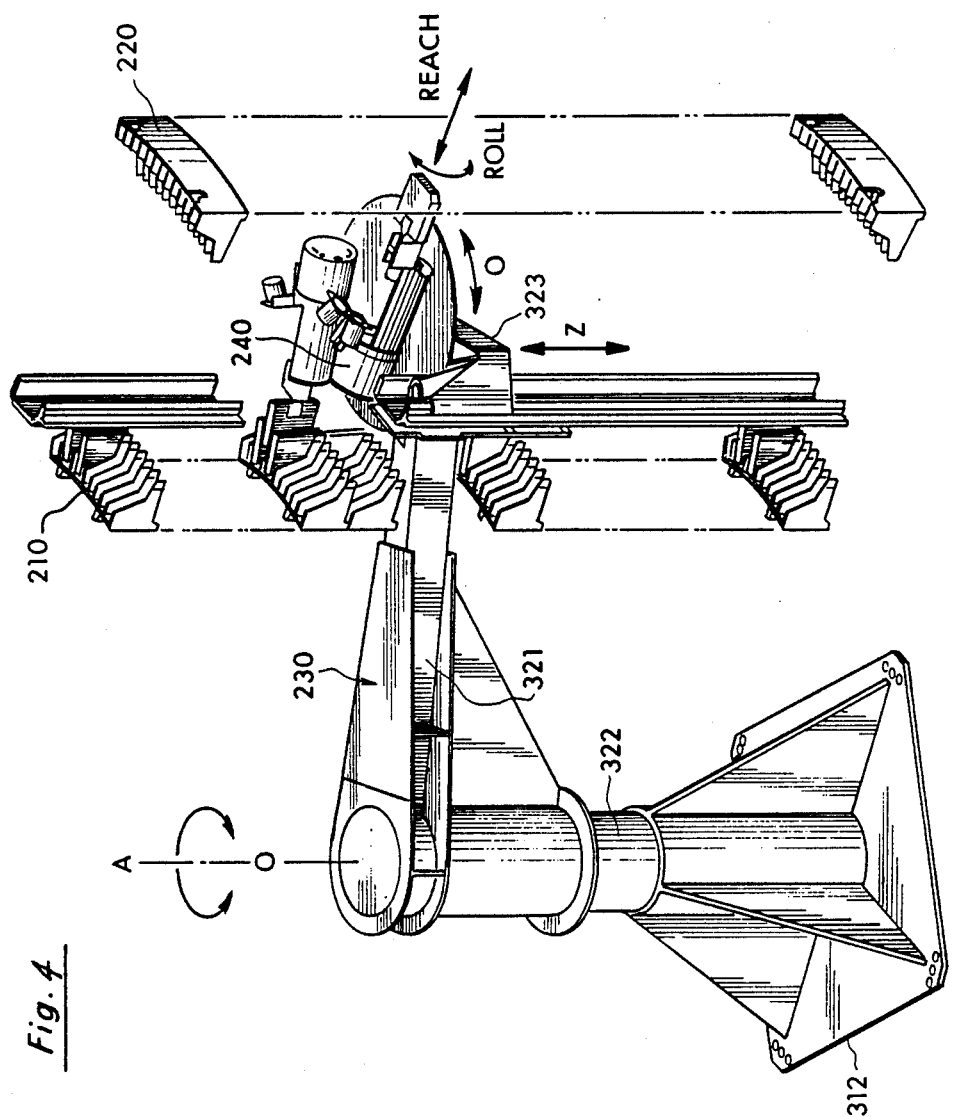
FIG. 4 illustrates a perspective view of the robot arm mechanism.

FIGS. 2, 3 and 4 illustrate a top view, side view and perspective view respectively of the robot arm assembly 230 of library module 111. The robot arm assembly 230 consists of a plurality of mechanisms all operating in conjunction to provide a movable arm for retrieving tape cartridges from their individual storage cells. The robot arm is described in detail in copending application Ser. No. 007,047 filed Jan. 26, 1987. The robot arm is discussed herein to illustrate the operation of this embodiment of the invention. The robot arm 230 consists of an arm assembly including a theta arm 321 rotatably mounted on a support column 322 which is attached to the floor plates 312 of library module 111. The arm assembly includes a Z mechanism 323 attached to the end of theta arm 321 remote from the support column 322. The Z mechanism 323 has coupled thereto a wrist, roll and finger assemblies 240 which perform the actual tape retrieval from the storage cell function. The Z mechanism 323 provides a vertical range of motion for the wrist, roll and finger assemblies 240 to access various levels of the tape cartridge storage cell array. The theta arm 321 locates the z mechanism 323 and its associated wrist, roll and finger assemblies 240 in the proper location to access both the inner 201 and outer 202 cylindrical arrays of tape cartridge storage cells. The robot arm support column 322 includes a motor which causes the theta arm 321 of the robot arm 230 to rotate about the pivotal point "A" of the robot arm 230 so that the robot arm 230 can access all of the tape cartridge storage cells in the circular array about the pivot point A. Thus, the elements in the robot arm assembly 230 cooperatively operate to access each and every storage cell in the entire library module 111. The servo motors controlling each of the various ranges of motion associated with elements in the robot arm assembly 230 are all controlled by control unit 122 connected to library module 111. Suffice it to say that the robot arm assembly 230 is operational to retrieve a tape cartridge from any of the approximately 6,000 tape cartridge storage cells in library module 111.

Vision System

A vision system 1201 located on the wrist (roll) assembly is illustrated in FIG. 1. Vision system 1201 is located on the top of the wrist assembly and is focused on a rectangular-shaped area a predetermined distance in front of the finger assembly when the finger assembly is fully retracted. The point of focus of vision element 1210 coincides with the position of a machine-readable label imprinted on the end of the magnetic tape cartridge stored in a magnetic tape cartridge storage cell. This focus is such that the vision element can read both the label imprinted on the end of the magnetic tape cartridge that is stored in the tape cartridge storage cell as well as a positioning target associated with the tape cartridge storage cell.

In order to enable vision element 1210 to read the label on the magnetic tape cartridge, a source of illumination is provided. The source of illumination consists of pair of lamps 1211, 1212 arranged one on either side of vision element 1210, and aligned in substantially the same orientation as vision element 1210. Lamps 1211 and 1212 are directed so that the light beams emanating from these two lamps illuminate a rectangular-shaped area in the line of sight of vision element 1210, which area coincides with the position of the label on the end of the magnetic tape cartridge. Thus, the illumination provided by the two lamps 1211 and 1212 is evenly distributed across the label on the magnetic tape cartridge so that vision element 1210 can accurately read the machine readable characters imprinted on the label.

Machine-Readable Label

FIG. 4 illustrates a typical label 400 that can be used on the magnetic tape cartridges in the automated magnetic tape cartridge library system. The label 400 incorporates a machine readable and human readable coding system. The first vertical column 401 of characters imprinted on the label 400 is divided into a series of vertically aligned, rectangular segments 411–416 each of which are separated from a contiguous other by a printing trap comprising a solid line 441. The rectangular segments are also separated from a second vertically aligned column 402 of characters adjacent to and coextensive with the first vertical column 401 of characters by another printing trap 442 comprising a solid line. One character 421–426 of a machine-readable and human-readable code is located within each rectangular segment 411–416 in the first column 401 of characters thereby forming a message in a first code. The second vertical column 402 contains a single rectangular segment containing a string of characters in a machine-readable code such as a bar code. This string of characters in the second vertical column 402 comprises a message in a second code which is identical to the message formed in the first vertical column 401 in the machine-readable and human-readable code. In addition, the background 431436 of each of the rectangular segments 411–416 contained within the first vertical column 401 are suitably color coded to correspond to the respective characters 421–426 of machine-readable and human-readable code contained therein, thereby providing a message in a third code which is identical to the above-described messages of the first and second codes. The two vertical columns 401, 402 of characters imprinted with the first and second codes are so arranged for redundancy purposes. The message (1, 2, 3, 4, 5, 0) in the first vertical column 401 are printed to be read downwardly from top to bottom while the bar code (*, 1, 2, 3, 4, 5, 0, *) in the second vertical column 402 is printed to be machine readable upwardly in the reverse direction. In this manner, the label 400 may be used to accurately identify a magnetic tape cartridge in spite of the absence of a portion of the label 400. For example, if the bottom segment of the label 400 were missing, the vision system 1201 would be able to read the first portion of the first code and the last portion of the second code. By combining these two readable segments of the first and second codes, the complete code on the label 400 can therefore be reconstructed by the vision system 1201.

It is obvious from this configuration of the label 400, that proper illumination is required for the vision system 1201 to be able to distinguish the machine readable bar code characters imprinted thereon. In the particular application discussed above, a pass scanning arrangement is used. The entire label 400 is illuminated by the source of illumination 1211, 1212 associated with the vision system while the illuminated image is focused on an array of photo detectors, such as a charge coupled device (CCD) that comprises the vision element 1210. The image of the dark bars of the bar code will fall on some of these photo detectors while the light spaces will fall on other of the detectors. An electrical signal is applied to the charge coupled device array of photo detectors 1210 and the light value at each photo detector is sequentially read out. Thus, the signal from the charge coupled device array can be processed and decoded in the same way as the signals produced in an active scanning system. An RS-170 type of signal is thereby obtained as the output of the vision system 1201. It is imperative, however, that sufficient balanced light be applied to the entire label so that the charge coupled device photo detectors will respond to the variation in dark and light areas caused by the presence of the bar code characters.

Tape Drive Unit

The tape cartridges retrieved from the individual tape cartridge storage cells are typically loaded onto a tape drive (ex 211) so that the data contained on the tape cartridge can be read by host computer 101. FIG. 2 illustrates the placement of two tape drive units 141, 142 on library module 111. The tape drive units are shown attached to two of the twelve outside walls of library module 111. Within each tape drive unit (ex 141) is located a plurality of individual tape drives 211-214 which function to read data from the tape cartridges therein. FIG. 2 illustrates a single tape drive (211) located in the tape drive unit 141 to illustrate the orientation of tape drive 211 and tape drive unit 141 with respect to the robot arm 230 and the cylindrical array of tape cartridge storage cells. In particular, a segment of the tape cartridge storage cells is removed from outer cylindrical array 202 to provide an aperture through which the front loading door opening of tape drive 211 protrudes a sufficient distance so as to be lined up with the surrounding storage cell arrays. The robot arm 230 can thereby load a tape cartridge into the tape drive with the same or similar range of motion as the replacement of a tape cartridge into one of the individual storage cells in the tape cartridge storage cell arrays. A side view of tape drive unit 141 is shown in FIG. 3 wherein four of the tape drives 211-214 are shown stacked one above the other in a vertical alignment within tape drive unit 141 illustrated in FIG. 2. As can be seen from FIGS. 2 and 3 the orientation of the tape drives 211-214 is such that a tape cartridge is placed into the tape drive ex 211 on an angle similar to that of the individual tape cartridge storage cells with the difference being that the tape drive 211 requires a horizontal loading of the tape cartridge while the tape cartridge storage cells store the tape cartridges in a vertical alignment. Thus the robot arm 230 in retrieving a tape cartridge from an individual tape cartridge storage cell and loading it into a tape drive unit 141 must rotate the tape cartridge through a 90 degree angle for proper orientation for loading into the tape drive 211.

MULTI-MODULE ARCHITECTURE

Figure 6:
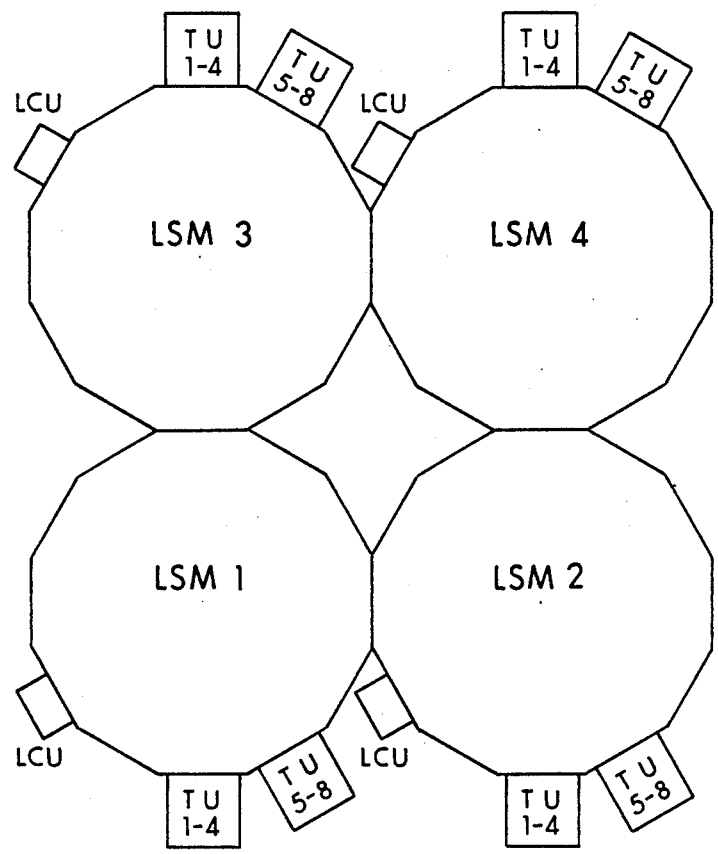
FIGS. 6 and 7 illustrate two multimodule arrangements of the automated magnetic tape cartridge library system.
Figure 7:
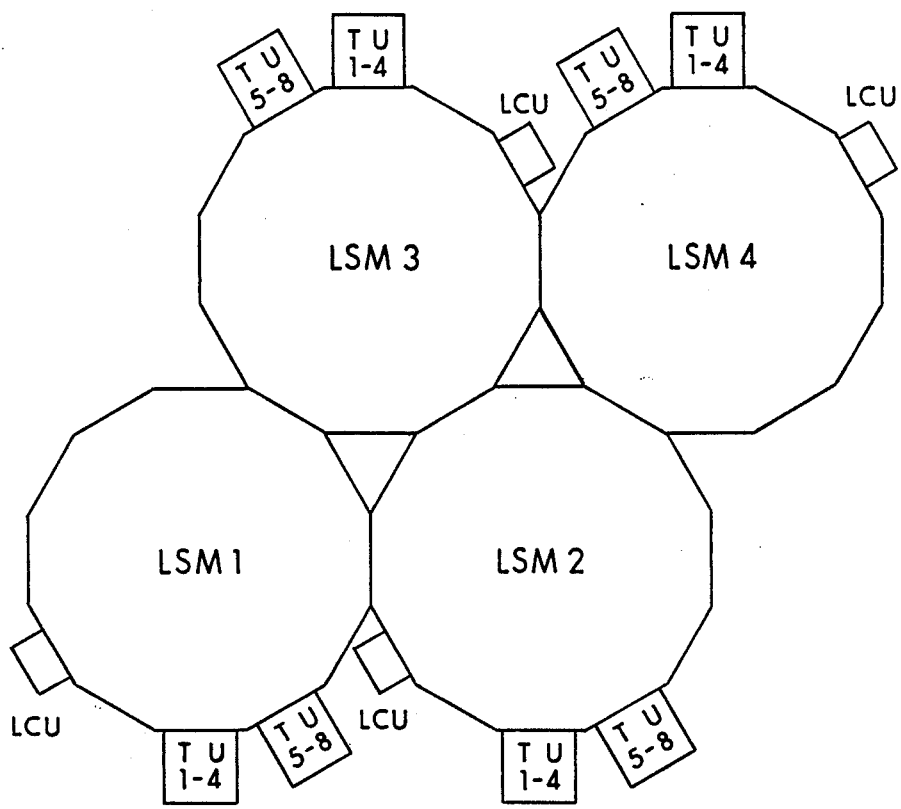

FIGS. 6 and 7 illustrate two of the plurality of ways of interconnecting four library modules. As it can be seen from these two figures, the four library modules can be connected as a rectangular shaped array or in a parallelogram shaped array. As can be seen from these two figures, four library modules can be interconnected in the form of a square or a parallelogram. It is also possible to connect these four modules in a straight-line I formation, in the shape of a T, in the shape of a J, in an L shape, in an S shape, in a star configuration or other variations thereof. The use of twelve sides provides the capability to interconnect adjacent library modules at 30 degree increments, with the only limitation being that one of the twelve sides of the library module must be reserved for connection to the control unit and another side of the library module must be reserved for an access door through which an operator can access the robot arm mechanism for maintenance purposes. Aside from this limitation, the library modules can be connected in any configuration desired by the user. Tape cartridge library software 110 can manage up to 256 library management units 121 and each library management unit 121 can handle up to 16 library modules 111. Therefore, one tape cartridge library software can manage 4096 library modules 111, with each library module 111 capable of handling approximately 6,000 cartridges. Thus, an entire automated tape cartridge library system can process over 24½b million 18 track magnetic tape cartridges, with each 18 track magnetic tape cartridge having a data storage capacity of approximately 200 megabytes. Thus with the number of library modules that can be interconnected and the alignment possibilities provided by the 30 degree incremental orientation of the library modules, a large number of configuration possibilities exist.

Pass-Through Port Mechanism

Figure 8:
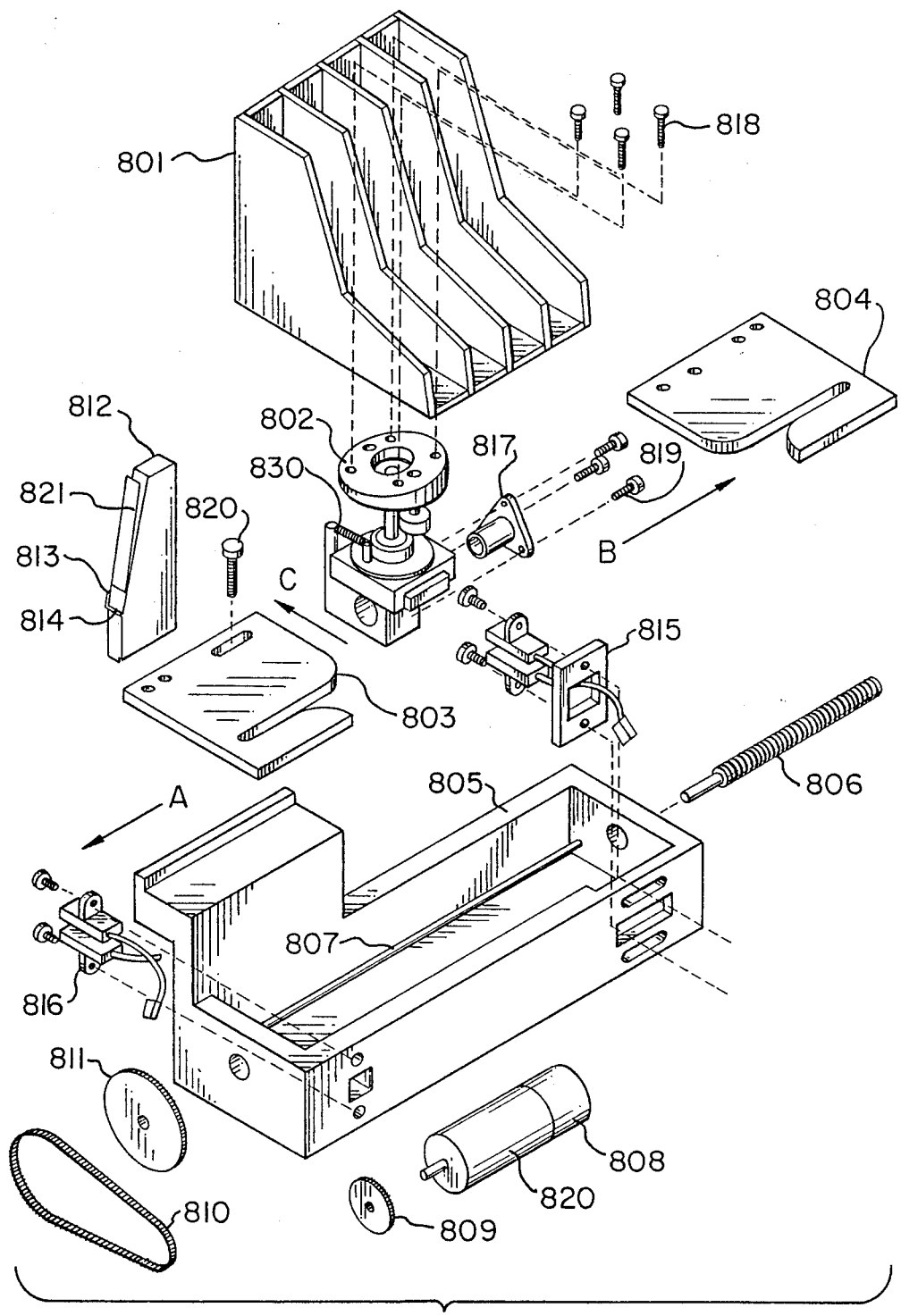
FIGS. 8 and 9 illustrate the pass-through port mechanism.
Figure 9:
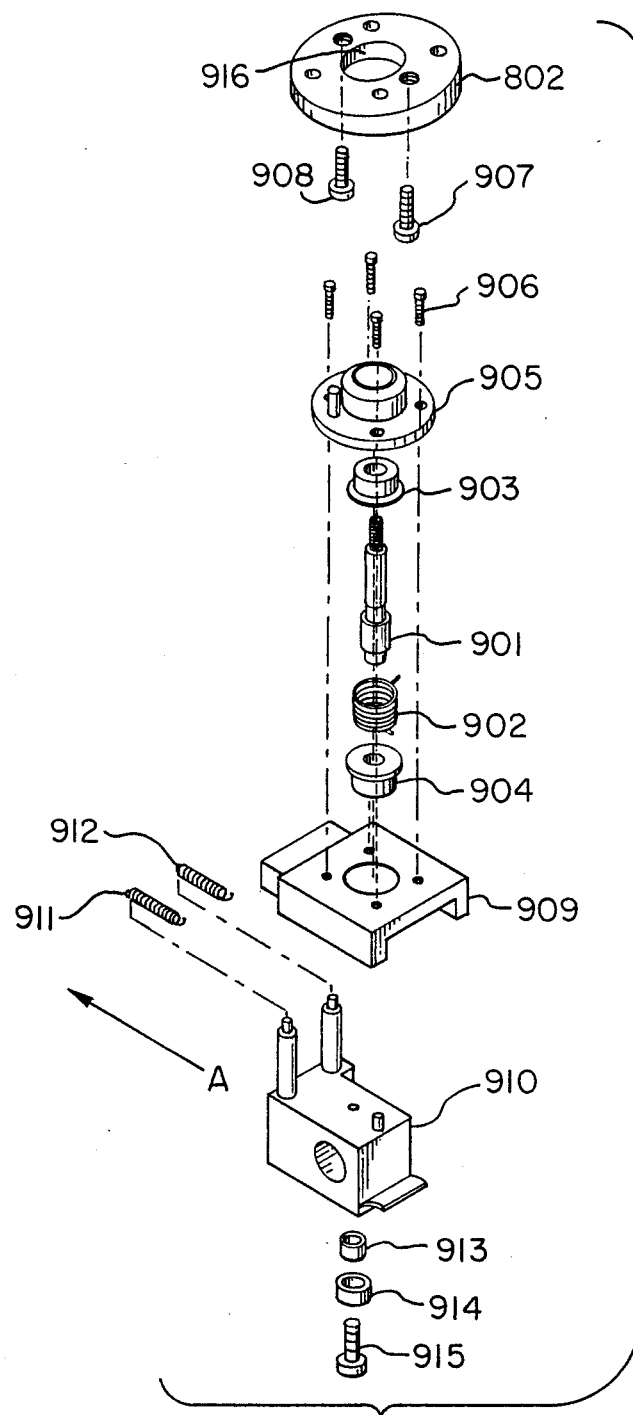

The method of interconnecting the library modules in juxtaposed position so that the robot arm contained in a library module can operate cooperatively with the robot arms in adjoining library modules is the pass-through port mechanism 150 disclosed in more detail in FIGS. 8 and 9. It is apparent that the task of interconnecting library modules is a non-trivial one since there are numerous misalignments that can take place between adjacent juxtaposed library modules 111, 112. The vertical alignment as well as horizontal alignment discrepancies between modules can cause simple yet disturbing module interconnection difficulties. In addition, any angular displacement about the three axes can cause serious misalignment problems so that the use of a robot arm to pass a tape cartridge from one library module to another can be frustrated by any of the above-described misalignments individually or in combination.

The solution to this perplexing problem is the use of a pass-through port 150 which automatically aligns the tape cartridge received from one robot arm in a library module to the orientation and alignment required of a robot arm in the adjoining juxtaposed library module. The pass-through port 150 consists of a set of transport storage cells 801 into which a robot arm places tape cartridges, which transport storage cells 801 are configured in similar fashion to the tape cartridge storage cells in the inner and outer cylindrical arrays. The mechanism to which this set of transport storage cells 801 is connected performs a number of functions. The mechanism transfers the orientation of the transport storage cells 801 from facing a first robot in a first library module to a 180 degree rotation to face the robot arm in the adjoining library module. This rotation is accomplished as the transport storage cells 801 are moved horizontally through adjoining openings in the walls of the adjoining library modules. The mechanism that provides this horizontal transport function also provides a self-aligning arrangement which translates the transport storage cells 801 through lateral, angular and horizontal distance alignment orientations so that the transport storage cells 801 exactly align with the tape cartridge storage cell arrays in the destination library module. The location of the pass-through port access holes at each library module are precisely placed so that the end points of the pass-through port mechanism 150 are precisely defined with respect to the axis of the robot arm of the adjoining library modules. It is the intermediary apparatus that connects these apertures in the adjoining library modules that provides the alignment function for the transport storage cells 801 as they traverse the distance from one library module to adjoining library module. This functionality enables a plurality of library modules to be interconnected so that these tape cartridges can be efficiently and expeditiously passed from one library module to another. This provides expansion capability of the automated tape cartridge library system heretofore unavailable for any automated tape library system.

The pass through port mechanism is illustrated in further detail in FIGS. 8 and 9. Pass through port 150 consists of frame 805 which is connected at one end to library module 115. Frame 805 includes lead screw 806 and guide shaft 807 on which carriage mechanism 830 rides. An electric motor 820 has an attached gear 809 which, by means of belt 810 drives gear 811 to turn lead shaft 806. In conventional fashion, when lead shaft 806 rotates the carriage mechanism 830 translates along the longitudinal length of frame 805 while riding on guide shaft 807 which also prevents the carriage mechanism 830 from rotating due to the movement of lead screw 806. Carriage mechanism 830 is shown in further detail in FIG. 9 and as shown in FIG. 8 supports an array of transport storage cells 801. Transport storage cells 801 are a segment of the standard tape cartridge storage cells used in the storage arrays of the automated library module 111. A pair of cams 803 804 are also connected by means of screws 820 to frame 805. The cams 804 are shaped so that the carriage mechanism 830, as it traverses the length of frame 805 encounters the surface of cams 803 and 804. The carriage mechanism 830 is a spring loaded mechanism which follows the surface of cams 803 and 804 to rotate the transport storage cells 801 through a full 180 degree rotation. In particular, when the carriage mechanism 830 is to the far forward of frame 805, which end is indicated by the arrow A, the transport storage cells 801 face their open ends in direction A. The angular arrangement of the notch in the cam 803 is such that the transport storage cells 801 point directly to the center axis A of the robot arm mechanism as illustrated in FIGS. 2, 3, and 4. As electric motor 820 drives gears 809 and 811, turning lead screw 806 which causes carriage mechanism 830 to traverse the length of frame 805 until it reaches the far end of frame 805. As it approaches the far end of frame 805, which end is termed the slave end of the pass through port, carriage mechanism 830 encounters cam 804 which serves to rotate transport storage cells 801 through 180 degree rotation so that the open end of transport storage cells 801 faces the center axis A of the robot arm mechanism of the library module 112 to which the pass through port 150 is connected. The rotational operation of this mechanism may be further understood by viewing FIG. 9 which is an exploded detail of the transport mechanism 830. The transport mechanism 830 consists of a center pivot shaft 901 around which is wound torsion spring 802. Washers 903 and 904 maintain the bottom end of torsion spring 902 in a fixed relation to frame 909 and allows the top end of torsion spring 902 to rotate about pivot shaft 901. The rotation of the torsion spring around pivot shaft 901 causes plates 802 and 905 to rotate. The torsion spring 902 is biased in a fashion so that transport storage cell 801 faces in the direction illustrated in FIG. 8 that is perpendicular to the movement of the carriage mechanism 830 along the length of frame 805. Thus, until carriage mechanism 830 comes in contact with either cam 803 or 804, the transport mechanism 830 faces transport storage cells 801 in the direction shown in FIG. 8. To compensate for any horizontal or lateral misalignments between adjacent library modules, transport carriage 830 is equipped with a pair of guide rollers 907 and 908 which follow the contours of cams 803 and 804. In addition, a slide mechanism 909 is provided to provide a range of motion perpendicular to the direction of travel of transport carriage 830, in direction C. This is accomplished by a pair of springs 911 and 912 attached to posts on housing 910 biasing slide mechanism 909 in the direction C illustrated in FIG. 8. As transport carriage 830 traverses the length of frame 805, guide rollers 907 and 908 come into contact with either cam 803 or 804 and the surfaces of cams 803 and 804 rotate transport storage cells 801 in either direction A or B as well as laterally displacing slide mechanism 909 to account for lateral misalignments of the adjacent library modules. The position of transport carriage 830 at either end of frame 805 is detected by means of a sensor mechanism which consists of flag 917 attached to the transport carriage 830 with a pair of sensors 815 and 816 located at either end of frame 805. Thus, when transport carriage 830 is an either end position along frame 805, flag 917 will make contact with either sensor 815 or 816 to indicate at which end of the pass through port the transport carriage 830 and transport storage cells 801 are located. In addition, a shaft encoder 808 attached to electric motor 820 counts the revolutions of the motor. The shaft encoder 808 provides a digital output to indicate how many revolutions have taken place in electric motor 820 thereby indicating the position of transport carriage 830. Pass through port 150 is also equipped with a positioning target 812 which consists of a housing that has a horizontal target 814 and a vertical target 813 attached to the front thereof for positioning alignment by the vision system of the robot arm. In addition, a label area 821 is provided so that pass through port 150 can be identified by use of a label readable by the vision system of the robot arm. One of these targets exists at either end of the pass through port and is connected to cam 803 and 804 respectively to indicate the position of transport storage cells 801 since cam 803 and 804 accurately position transport storage cells 801 with respect to targets 813 and 814 irrespective of the alignment of the adjacent library modules.

Tape Cartridge Library Software Architecture

Figure 10:
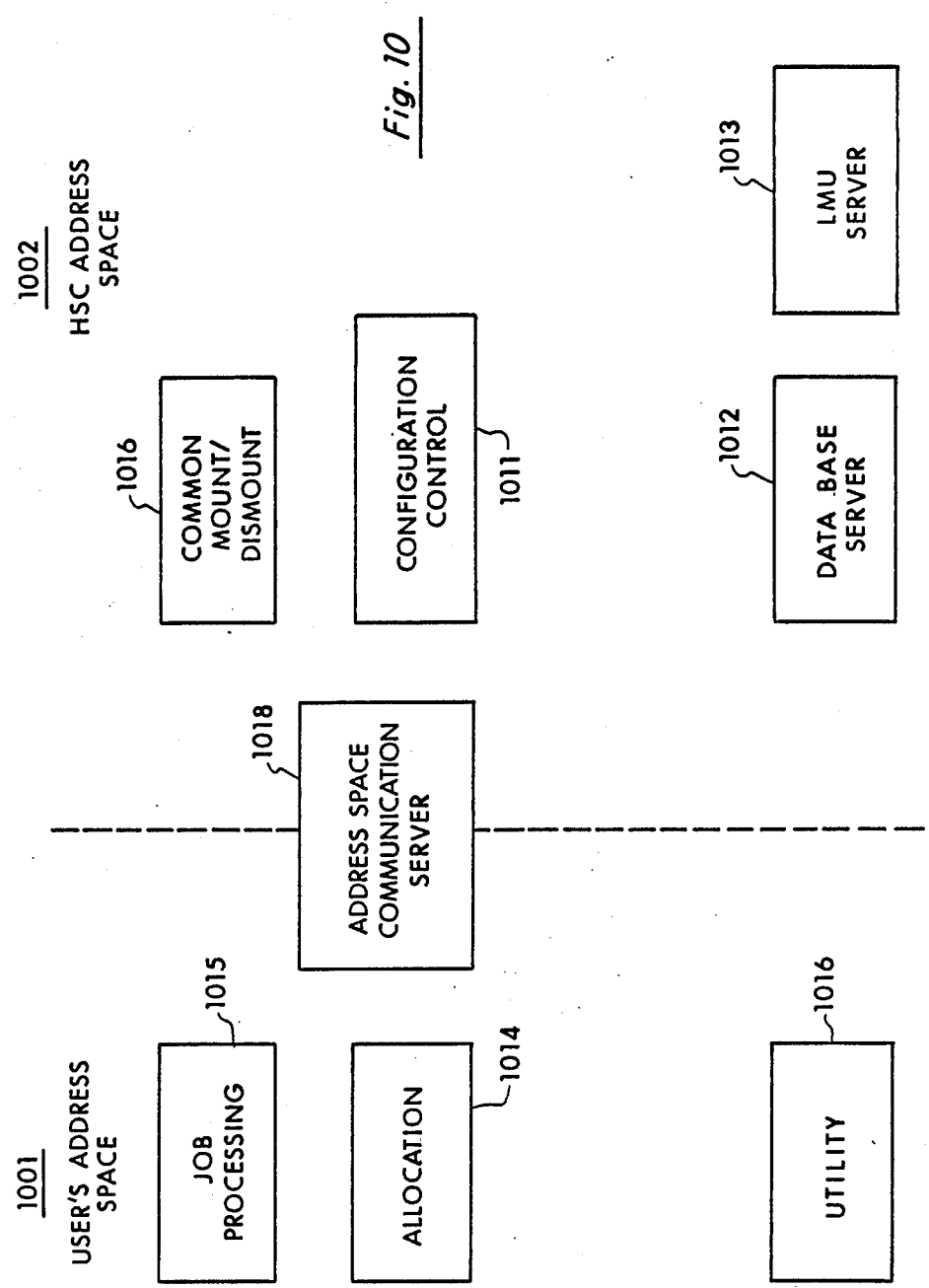
FIGS. 10 and 11 illustrate, in flow diagram form, the operational steps taken by the automated magnetic tape cartridge library system to select and transport a magnetic tape cartridge.

FIG. 10 illustrates in block diagram form the architecture of library software 110 which resides in host computer 101. The library software architecture is divided into two segments, a first segment 1001 consists of software routines located in the user's address space of host computer 101, while the second portion 1002 consists of software components that are located in the host computer address space. The software is divided up into these two segments in order to provide an interface between the host computer 101 and the automated tape cartridge library system 100 that is transparent to the host computer 101. This is accomplished by providing software routines in the host computer access space, which routines intercept the normal control messages that the host computer 101 sends to the operator console. These control messages are then used to activate the automated tape cartridge library system 100 This software also provides data flow in the reverse direction in the form of console messages to indicate to the host computer 101 that the particular requested operation has been completed. In this fashion the host computer 101 need not be modified in order to support the installation of the automated tape cartridge library system 100.

In order to accomplish this function, a number of software routines are provided in the host software component architecture. These software routines include configuration control 1011 which provides coordination and control of the library which is used to store data to identify tape cartridge volume numbers and the physical location of each tape cartridge. Data base server 1012 provides control of the library control data base itself. LMU server 1013 provides a communication interface for each of the library module units 121 in the automated tape cartridge library system 100. Allocation software module 1014 translates a request for a tape mount or dismount to take place into the identification of a particular available tape drive in the automated tape library system 100. Job processing software component 1015 traps console messages and converts these messages into control messages which are transmitted to the mount/dismount software component 1016. The mount/dismount software component 1016 receives these control messages and performs the requested tape cartridge mount or dismount operation by transmitting control signals through LMU server 1013 to the particular library management unit 121 associated with the selected automated tape cartridge library system 100. In addition, utility software 1016 and administration software 1018 are provided to generate administrative reports on the operation of the library resources as well as to provide maintenance installation and control interfaces with the operator console.

Allocation

Figure 11:
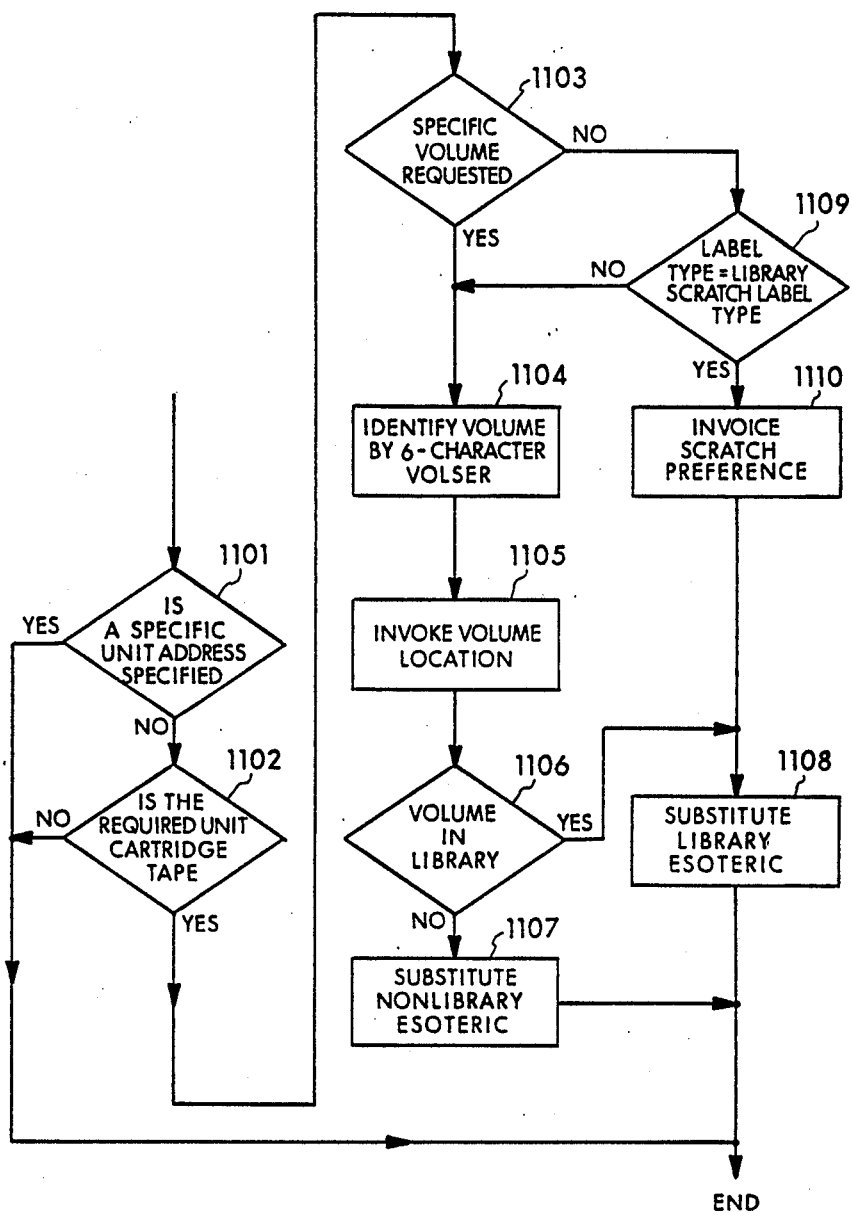
Figure 12:
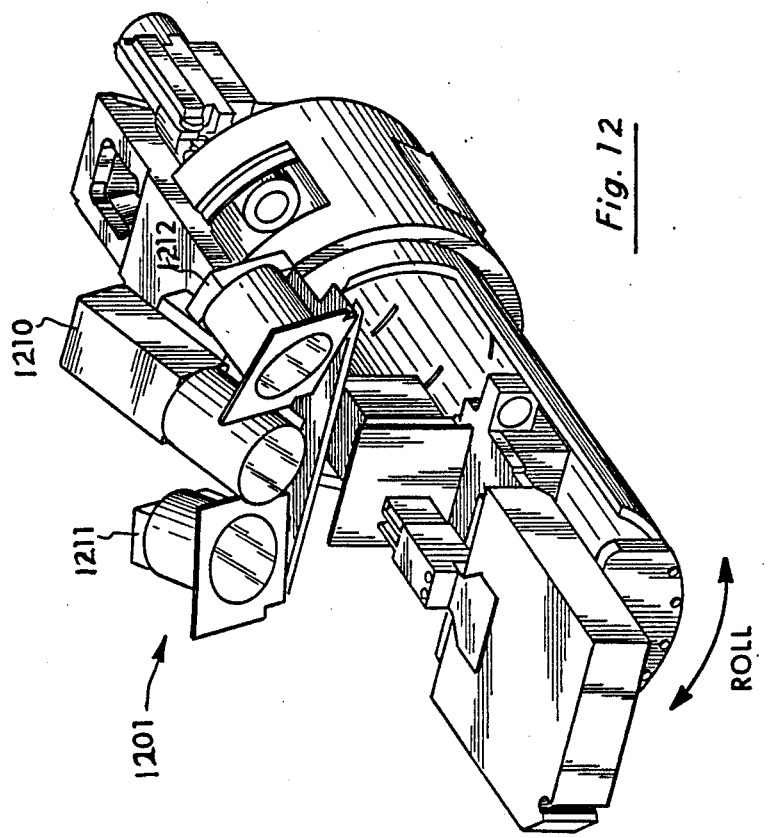
FIG. 12 is a perspective view of the vision system and its source of illumination which are positioned at the end of the robot arm.
Figure 13:
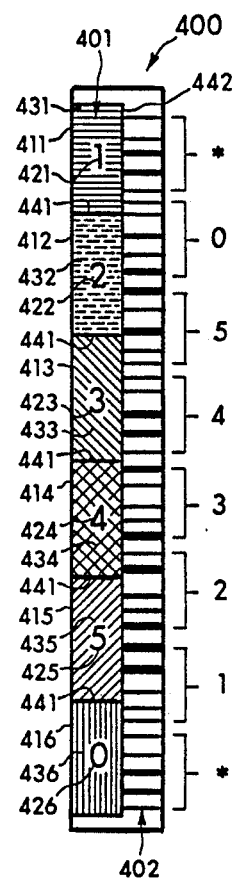
FIG. 13 illustrates a typical label format that can be used in this system.

In order to more fully understand the operation of tape cartridge library software 110, a typical tape cartridge mount request operation will be described in detail. This operation begins when a user on one of the host computer systems, such as 101, requests access to a particular set of data which is stored on a tape cartridge located in one of library modules 111, 112. This request for access to a tape cartridge enters host computer 101 either through a console message from the host computer operator or from a user connected to host computer system 101 via one of a plurality of data terminals (not shown) connected thereto. The host computer 101 responds to the request for a tape cartridge by invoking allocation processing and by providing the name of the data set requested, the volume serial number of the tape cartridge and identification of the type of device that the data set is to be mounted on. The tape cartridge library software 110 intercepts this allocation request and gains control of the allocation operation. Tape cartridge library software 110 by way of configuration software 1011 and data base server 1012 searches the library data base to determine which library module 111, 112 contains the requested tape cartridge. This is done by reviewing the data tables stored in the tape library to obtain the correspondence between the tape cartridge volume serial number and the physical location of the tape cartridge in library module 111 or 112. Assume for the purpose of this discussion that the tape cartridge is located in library module 111. FIG. 11 illustrates in flow diagram form the operation of the tape cartridge library software allocation operation.

As step 1101, tape cartridge library software 110 determines whether a specific tape drive unit address was specified. If an exact address was specified, the allocation process need proceed no further since a tape drive had already been designated. Processing then proceeds to exit back to the host computer operating system. Assume for the purpose of this discussion that a specific unit address was not specified, then host software component processing advances to step 1102 where the determination is made of whether the requested device type is a tape cartridge drive or not. If the requested unit is not a tape cartridge drive, then the requested unit would not be part of the automated tape cartridge library system 100 and processing again would exit this particular subroutine. Assume again for the purpose of this description that the required unit is a tape cartridge drive, then processing advances to step 1103 where a determination is made of whether a specific tape cartridge volume was requested. If a specific tape cartridge volume is requested, processing advances to 1104 where the tape cartridge volume number is translated into a six-character volume serial number, known as VOLSER. Processing then advances to step 1105 where the volume location conversion operation is invoked. This operation requires a table look-up to convert the six-character VOLSER into an exact physical location of the tape cartridge in library module 111. Once this conversion has been completed, processing advances to step 1106 where determination is made of whether the volume is in library module 111. If it is not, processing advances to step 1107 where a message is generated to indicate that the tape cartridge is not stored in the automated tape cartridge library system 100 but is available elsewhere and can be retrieved by means of an operator manually retrieving the tape cartridge volume and loading it into a manual load tape drive unit. Processing then exits back to the operating system of host computer 101. For the purpose of this description, assume that the volume is in library module 111. Processing then advances to step 1108 where a unit name is substituted for the generic tape drive request What this means is that a particular tape drive is identified by tape cartridge library software 110 as being available in automated tape cartridge library system 100 and this tape drive is the one in which the requested tape cartridge will be mounted so that data can be retrieved by host computer 101.

An alternative situation is where at step 1103 a specific tape cartridge volume is not requested. In this case, processing advances to step 1109 where a determination is made of whether the type of volume requested is a library scratch volume; that is, a blank tape cartridge stored in library module 111 available to be used by any of the users of host computer 101. If a scratch volume is not requested, then an error has occurred and processing is aborted and control is returned to the operating system of host computer 101. If a scratch volume is requested, processing advances to step 1110 where a routine is invoked to determine the location of scratch tape cartridge volumes in the automated tape cartridge library system. This routine maintains a list of all scratch tape cartridges in the entire automated tape cartridge library system and attempts to provide a uniform distribution of scratch tape cartridge volumes throughout the library modules 111, 112 so that a disproportionate number of scratch tape cartridges are not stored on a single library module. Once a particular scratch tape cartridge volume has been located and designated as available for use, processing advances again as before to step 1107 where a particular available tape drive is identified.

Tape cartridge library software 110 has, therefore, intercepted the invocation of the host computer allocation process and has provided its own resource allocation in transparent fashion so host computer 101 is not aware of the fact that an automated magnetic tape cartridge library system 100 is connected to host computer 101. What tape cartridge library software 110 returns to host computer 101 at the end of the above-described processing, is an identification of the particular tape cartridge drive that is available for mounting the requested tape cartridge. Host computer 101 proceeds with its processing until it is ready to request that the particular tape cartridge be mounted.

Volume Mount Operation

When host computer 101 requests that a designated tape cartridge be mounted, tape cartridge library software 110 intercepts this console command and activates a job processing software 1015 which, through LMU server software 1013, insures that the tape cartridge drive is available. If the tape cartridge drive is available, job processing software 1015 transmits robot arm control commands through LMU server software 1013 package which transmits these commands to the 3274 terminal control unit (120) which acts as a protocol converter interface between host computer 101 and library management unit 121. The 3274 terminal control unit 120 converts the control messages received from host computer 101 into a format that is compatible with library management unit 121 and transmits these adapted control messages over a data link 162. Library management unit 121 is configured to look like a 3278 Model 2 terminal and, therefore, requires a 3274 terminal control unit to be interposed between the host computer 101 and the library management unit 121. Library management unit 121 takes the control messages transmitted from host computer 101 by way of tape cartridge library software 110 and adapts these commands to operate the robot arm in library module 111.

The control messages received from tape cartridge library software 110 and library management unit 121 consists of an information storage volume or tape cartridge mount command, an indication of which library module 111 the tape cartridge resides, its exact physical location in library module 111, where the physical location is designated by a panel in the tape cartridge storage array and a row,/column indication of where on this particular panel the tape cartridge is stored. In addition, control signals indicate the destination library module 112 so that library module 111 is instructed to transfer the retrieved tape cartridge through pass through port 150 to library module 112. Library management unit 121 utilizes the received control signals to position the robot arm so that the retrieval mechanism, the robot hand is positioned to the correct panel/row/column location associated with the designated tape cartridge to be retrieved. The vision system on the robot arm examines the identification label on the tape cartridge and when the identification is verified as matching that indicated by host computer 101, the robot hand is extended, the cartridge is grasped and removed from the storage cell in which it has been placed. The robot hand retract the cartridge and once the cartridge has cleared the side of a particular storage cell, the robot mechanism is relocated to an alignment with the pass through port. Library management unit 121 signals library module 111 to insert the retrieved tape cartridge into the transport storage cells and the robot hand is extended and the tape cartridge placed in an available one of the transport storage cells. The hand is then retracted and the robot arm is available for any other tape cartridge retrievaloperation.

Library management unit 121 in response to the placement of the retrieved tape cartridge in one of transport storage cells 801 in pass through port 150 transmits control signals to pass through port 150 to activate the drive mechanism therein to transport the transport storage cells with the retrieved tape cartridge from the first library module 111 to the second library module 112. As discussed above, in response to these control signals the pass through port mechanism relocates the transport storage cells from an alignment within the first library module 111 through the horizontal distance separating the two library modules to an alignment with the robot arms in the second library module 112. Upon the completion of this transfer, a sensor is activated in pass through port 150 which sensor transmits a signal to library management unit 121 to indicate that the pass through port operation has been completed. The library management unit 121 in a response to the signals received from pass through port 150, signals the robot arm in library module 112 to move the retrieved tape cartridge from pass through port 150 to the selected tape drive 211. Once the robot arm loads the tape cartridge and tape drive 211, tape control unit 131 interconnects tape drive 211 with host computer 101 by way of data paths 175 and 173.

Tape control unit 131 manages the writing and reading of data to and from the attached tape transport mechanisms 141-144. Tape control unit 131 can be connected to up to four tape drive units 141-144 each of which contains four tape drives. Thus a tape control unit 131 can interconnect up to sixteen tape drives with the host computer 101. The data path 175 interconnects tape control unit 131 with host computer 101 contains four data channels. Tape control unit 131 receives commands from host computer 101 over these four data channels, decodes these commands and selects tape drives and issues commands to them, and passes data from the channel to the transports and vice versa. Thus, tape control unit 131 functions as a multiplexer interconnecting the sixteen tape drives to the four channels connected to the host computer Data and control and status signals are passed back and forth between host computer and the tape drive units by way of tape control unit 131. In addition, tape control unit 131 contains a data buffer which is a first end first out dynamic random access memory connected between the four data channels 175 connected to the host computer 101 and the tape drives located in the tape drive units 141-144. The data buffer masks the inherent slowness of a mechanical tape drive system and permits data transfers to and from the automated tape cartridge library system at data channel speeds. In addition, while data to and from the transport flows at a rate proportional to the speed of the moving magnetic tape on a magnetic tape cartridge, the channel can begin writing data to this data buffer while the magnetic tape is coming up to speed. The channels can write in the data buffer the data it wants to transfer, disconnect from the connection, leaving the data buffer to send data to the tape drive without further involvement of the channel. In the reverse direction, a channel waits until all or most of the data from the file stored on the tape cartridge is in the data buffer and reconnects to the channel and transfers the data to host computer 101.

While a specific embodiment of this invention has been disclosed herein, it is expected that those skilled in the art can design other embodiments that differ from this particular embodiment but fall within the scope of the appended claims.

What is claimed is:

1. In a data processing system which includes a host computer connected to a plurality of information storage volume read/write devices and also connected to an automated library system, which includes two or more interconnected library modules, each of which stores information storage volumes for retrieval and placement into ones of said information storage volume read/write devices, an information storage volume security arrangement to permit data retrieval by said host computer from a selected information storage volume located in said automated library system without human access to said information storage volume comprising:
- means responsive to a request from a user on said host computer for a data file stored on one of said information storage volumes for translating said data file request into an identification of the information storage volume that contains said requested data file;
- means for converting said information storage volume identification to a definition of a physical location in said automated library system of said identified information storage volume;
- means responsive to said definition for selecting one of said information storage volume read/write devices to read/write said requested information storage volume;
- means responsive to said selecting means for robotically transporting said identified information storage volume from said identified location to said selected information storage volume read/write device;
- means for performing an information storage volume audit, to determine if each information storage volume in said automated library system in located in its assigned information storage cell.

2. The system of claim 1 wherein said automated library comprises:
- two or more self contained and independently operating automated library modules, each juxtaposed to at least one other one of said automated library modules.

3. The system of claim 2 wherein each of said automated library modules includes:
- a plurality of volume storage cells, each of which stores a single one of said information storage volumes;
- robot means for automatically retrieving said identified information storage volume from the one of said volume storage cells that houses said identified information storage volume.

4. The system of claim 3 wherein said automated library system includes:
- one or more pass-through port means each connected to and interconnecting each juxtaposed pair of said automated library modules, for transporting said identified information storage volume retrieved by said robot means in a first one of said juxtaposed pair of automated library modules to said robot means in the second one of said juxtaposed pair of automated library modules.

5. The system of claim 4 further including:
- means responsive to said translating means and said selecting means for defining a series of move operations, which series represents a sequence of operations in said two or more automated library modules to transport said identified information storage volume from said identified volume storage cell to said selected information storage volume read/write device.

6. The system of claim 5 further including:
- means responsive to said defined series of move operations for generating control signals to sequentially activate said robot means and said pass-through port means in each of said automated library modules in said series of volume move operations to retrieve said identified information storage volume from said identified storage cell to said selected information storage volume read/write device.

7. The system of claim 1 wherein said information storage volumes comprise magnetic tape cartridges.

8. The system of claim 1 wherein said information storage volume read/write devices comprise tape transports.

9. The system of claim 1 wherein each of said automated library modules includes:
- exterior housing means for completely enclosing said robot means and said volume storage cells in a self-contained housing that excludes access to said information storage volumes stored therein;
- interlock means responsive to the opening of the human access door for recording a potential breach of security.

10. The system of claim 8 wherein said magnetic tape cartridges include a machine readable label.

11. The system of claim 10 wherein said robot means includes:
- means for reading said machine readable label on said magnetic tape cartridges.

12. The system of claim 11 wherein said reading means comprises a vision system for reading a printed label.

13. In a data processing system which includes a host computer connected to a plurality of information storage volume read/write devices and also connected to an automated library system which stores information storage volumes for retrieval and placement into ones of said information storage volume read/write devices, an information storage volume security arrangement to permit data retrieval by said host computer from a selected information storage volume located in said automated library system without human access to said information storage volume comprising:
- means for intercepting a request from a user on said host computer for data stored on one of information storage volumes for translating said request into an identification of the physical location in said automated library system of said requested information storage volume;
- means responsive to said identification for selecting one of said information storage volume read/write devices to read/write said requested information storage volume;
- means responsive to said selecting means for robotically transporting said requested information storage volume from said identified location to said selected information storage volume read/write device; and
- means for performing an information storage volume audit, to determine if each information storage volume in said automated library system is located in its assigned information storage cell.

14. The system of claim 13 wherein said performing means includes:
- means for maintaining a list of information storage volumes and their corresponding information storage cells;
- means for activating said reading means to sequentially read said label on all information storage volumes stored in said automated library system;
- means responsive to said maintaining means and said reading means for comparing said list and said label read at each information storage cell.

15. The system of claim 14 further comprising:
- means responsive to said comparing means determining a mismatch between said list and said label read at an information storage cell for activating said robot means to transport the information storage volume in said particular information storage cell to a designated storage location.

* * * * *